Feb. 27, 1934.   A. B. WELTY   1,948,895
HARVESTER THRESHER
Filed April 6, 1931   4 Sheets-Sheet 2

Inventor
Albert B. Welty
By _____ Atty.

Feb. 27, 1934.  A. B. WELTY  1,948,895
HARVESTER THRESHER
Filed April 6, 1931  4 Sheets-Sheet 3
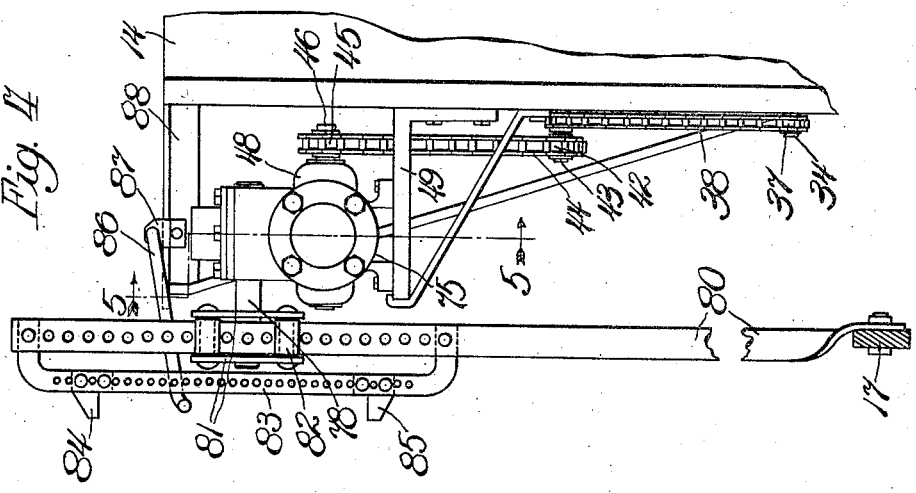

Feb. 27, 1934.  A. B. WELTY  1,948,895
HARVESTER THRESHER
Filed April 6, 1931   4 Sheets-Sheet 4
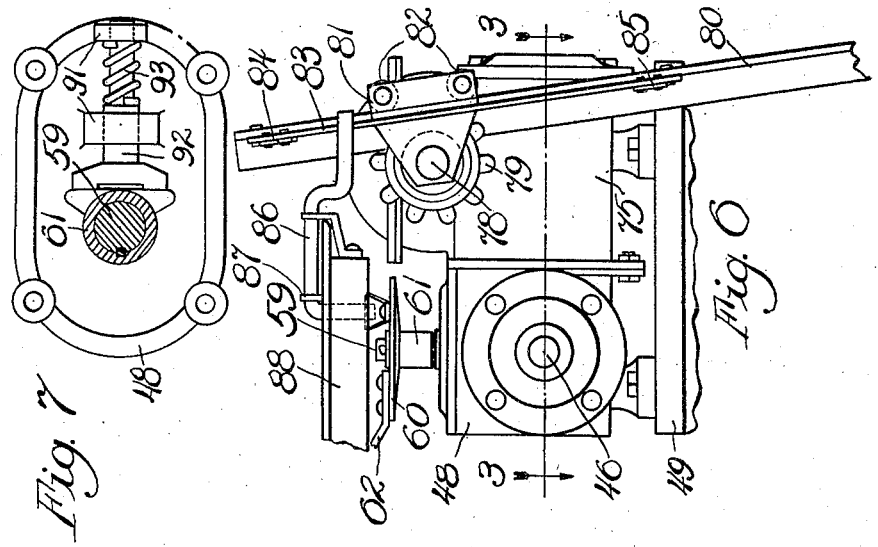
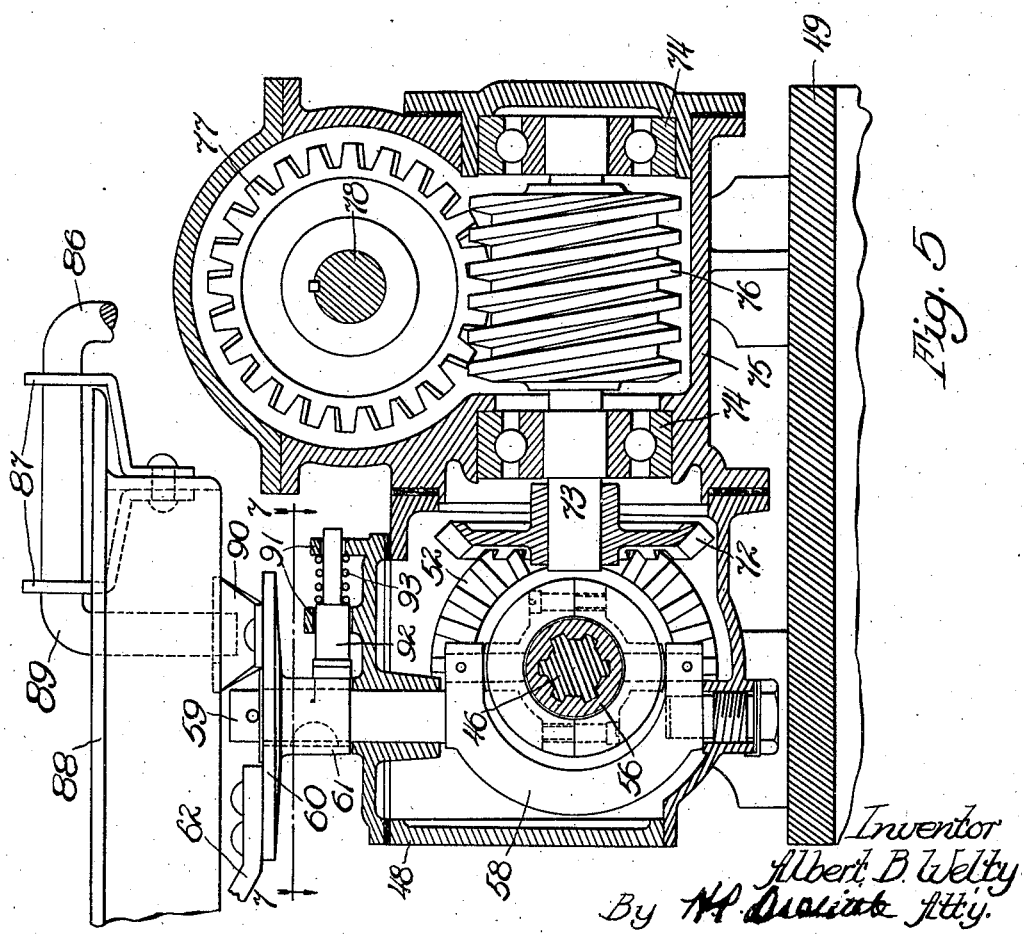
Inventor
Albert B. Welty
By Patented Feb. 27, 1934

1,948,895

UNITED STATES PATENT OFFICE 1,948,895

HARVESTER THRESHER

Albert B. Welty, Chicago, Ill., assignor to International Harvester Company, a corporation of New Jersey Application April 6, 1931. Serial No. 527,880

17 Claims. (Cl. 56—20)

The invention relates to harvester threshers. More particularly it has to do with the provision of manually initiated power connections for adjusting the platform of the harvester thresher up or down as the machine traverses a field, to alter the height of cut in accordance with tall or short grain encountered.

The objects of the invention are to provide means for power adjusting the platform of the harvester thresher; to provide such means which will be controllable from the operator's seat on a tractor which pulls the harvester thresher; to provide automatic throw-out mechanisms for the power means when the platform reaches a maximum or minimum position; and, lastly, to provide such power control which will be simple, compact and cheap to manufacture, and which, furthermore, may be easily adapted for attachment to standard forms of harvester threshers without materially altering the construction thereof.

These objects will be achieved by the structure to be presently described in detail, the same being shown in the accompanying sheets of drawings, wherein:

Figure 3 is a horizontal, sectional view on an enlarged scale through the power adjuster unit, as seen along the line 3—3 appearing in Figure 6, when viewed in the direction indicated by the arrows;

Figure 4 is a front elevational detail view of this power unit;

Figure 5 is a vertical sectional view through the power unit, on an enlarged scale, as viewed along the line 5—5 appearing in Figure 4, when looking in the indicated direction;

Figure 6 is a side elevational view of the structure shown in Figure 4; and,

Figure 7 is a top plan view, partly in section, of a detail, as seen along the line 7—7, looking down, appearing in Figure 5.

Figure 1:
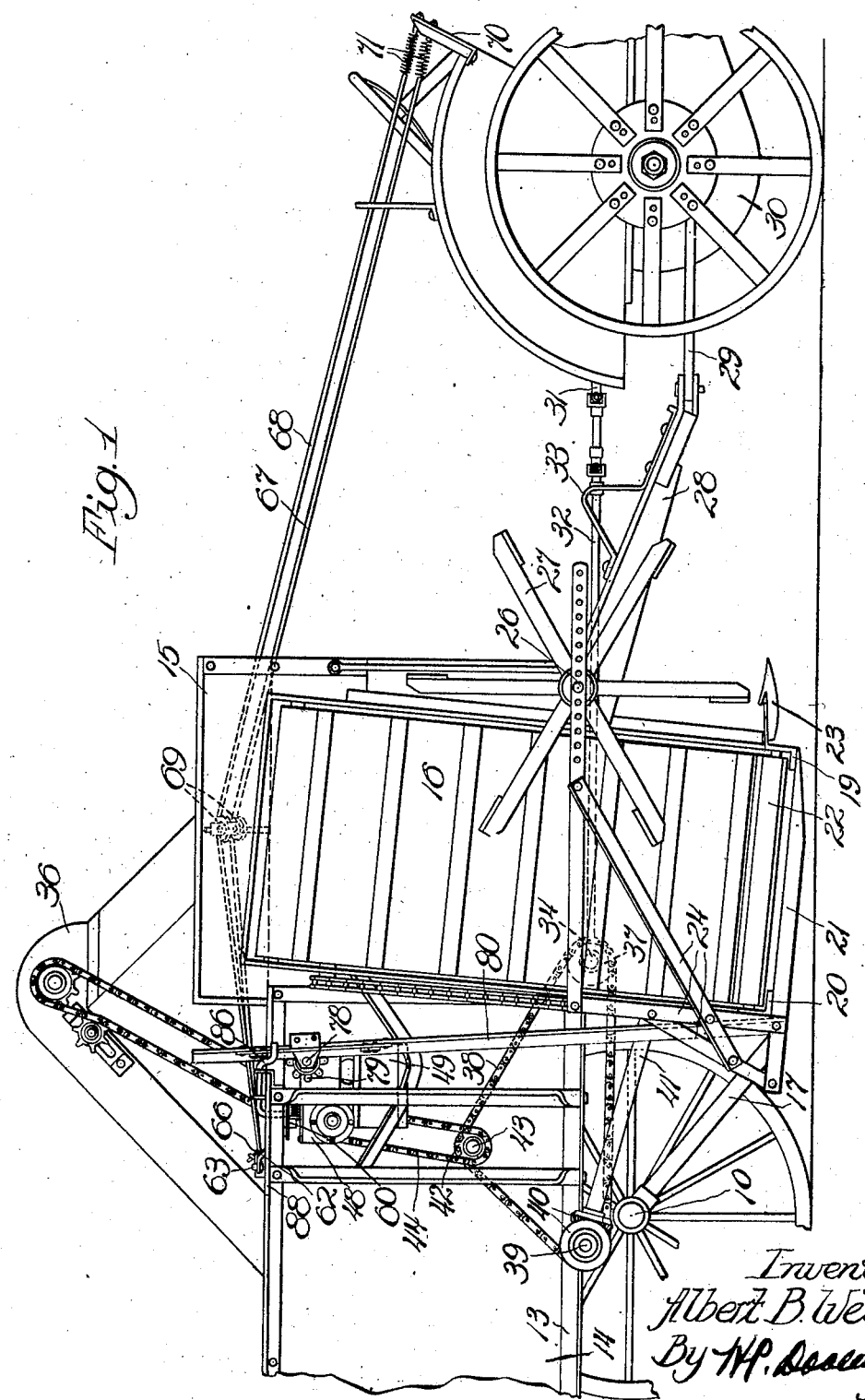
Figure 1 is a general side elevational view of the tractor pulled harvester thresher, showing the improved power lift platform.

The harvester thresher shown is carried on a transversely disposed axle 10 mounted in a main wheel 11 and a grain wheel 12. Adjacent said main wheel, the axle 10 carries the usual longitudinally arranged main frame 13 that supports the thresher housing 14 containing any conventional form of separator mechanism. At the forward end of the housing 14 is the feeder housing 15, which is open at its grainward side to receive the grain from an upwardly inclined elevator spout 16. Between the body or housing 14 and the grain wheel 12, the axle 10 in any usual way has pivotally connected thereto inner and outer forwardly extending line bars 17 connected by a cross brace 18. These line bars 17, as shown best in Figure 1, extend downwardly and forwardly, the forward extensions thereof carrying a front, transverse Z-bar 19 and a rear, transverse angle bar 20. Connected between these two bars is a conventional platform 21 carrying the usual platform conveyer 22 leading to the spout 16, heretofore described, the lower end of which is carried by the platform. The Z-bar 19 carries the cutting mechanism indicated by the figures 23. Further, the platform carries upright frame pieces 24 carrying a support 25 for mounting a reel shaft 26 and reel 27.

The forward end of the main frame 13 is extended ahead to form a hitch 28 that pivotally connects directly to the drawbar 29 of a tractor generally indicated at 30.

This tractor is of the kind having a rearwardly extending, longitudinal power take-off shaft 31 appropriately coupled with a line shaft 32 supported in a bracket 33 carried on the hitch 28, said shaft 32 extending back underneath the housing 15. This shaft is geared to drive a cross shaft 34 carried in the body of the thresher, said shaft 34 at one end having connections 35 for operating an elevator 36 located at the stubbleward side of the thresher body 14. The opposite end of this shaft 34, as appears in Figure 1, carries a sprocket wheel 37 that drives a chain 38. Said chain 38 also drives a shaft 39 and gearing 40 for operating a forwardly extending shaft 41 which in the usual way, not shown, operates connections to drive the elevator spout 16 and platform conveyer 22. The reel 27 and sickle 23 are also conventionally operated. As these drives form no part of this invention, they need not be described.

As viewed in Figure 1, the chain 38 furthermore drives a sprocket wheel 42 on a shaft 43 carried in the body 14. From this sprocket wheel 42 is driven a chain 44 that operates another sprocket wheel 45 (see Figures 3 and 4) which is pinned to a transverse shaft 46 journaled in bearings 47 mounted in a casing 48 carried on a shelf 49 appropriately supported from the grainward side of the thresher body or housing 14.

Figure 2:
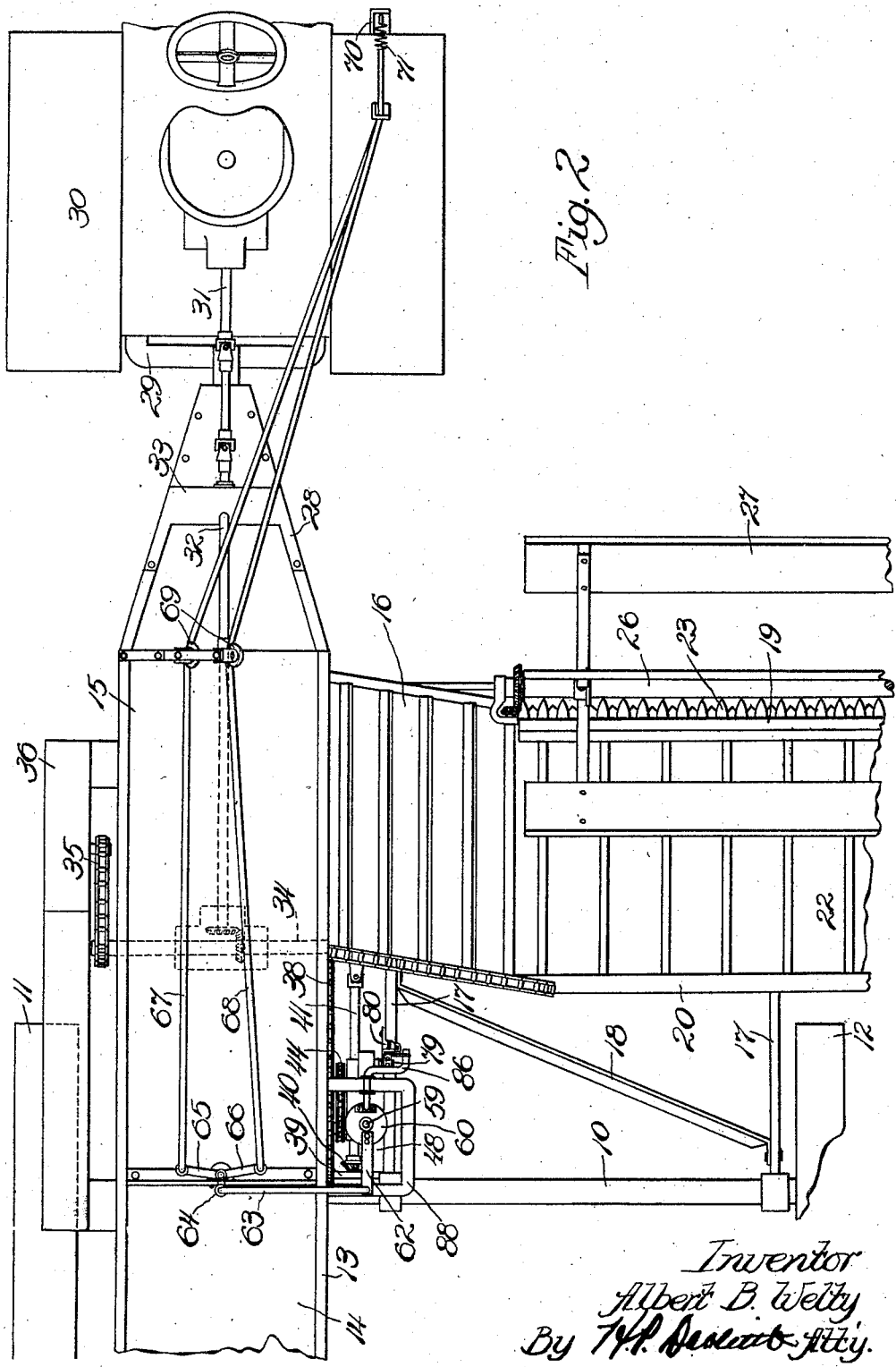
Figure 2 is a general plan view.

As shown in Figure 3, this shaft 46 within the case 48 carries two spaced sleeves 50, 51, on which are loosely and turnably carried two bevel gears 52, 53, respectively, each of which gears respectively includes internal cone clutch faces 54, 55. The central portion of the shaft 46 between the two spaced sleeves 50, 51 is splined slidingly to carry a double clutch element 56, presenting opposite cone clutch surfaces 57 complementary to the surfaces 54, 55. A shipper fork 58 encircles the element 56, said shipper fork 58 being actuated left or right by a vertical rockshaft 59 to which it is connected. This shaft 59 protrudes upwardly through the top of the casing 48, where it is held in a circular, horizontal plate 60 formed on a sleeve 61 surrounding the shaft 59 to which it is keyed, and resting turnably on top of the case 48, as best appears in Figure 5. Connected to the plate 60 is a rearwardly extending arm 62, which, as shown in Figure 2, is connected with a transverse push-pull link 63 supported in any suitable manner across the top of the thresher housing 14. The stubbleward end of the link 63 is connected to a bell crank lever 64 having a suitable pivotal mounting on the housing 14 and being provided with two oppositely extending arms 65, 66 which respectively connect with flexible cables 67, 68 extending forwardly past suitable sheaves 69 and thence down and ahead to a bracket 70 to which the cables 67, 68 are dead-ended to a position on the tractor in close proximity to the operator's station thereon. Springs 71 may be provided in the manner shown to take slack out of the flexible cables or ropes 67, 68. The controls just described permit the operator, from his seat on the tractor, to shift the clutch 56 either right or left for a purpose presently to appear.

The bevel gears 52, 53, as shown in Figures 3 and 5, are in constant mesh with a gear 72 which is made fast on a shaft 73 journaled in bearings 74 located in an extension 75 of the case 48. Within this case extension 75, the shaft 73 carries and turns a worm pinion 76 in mesh with a worm gear 77 (see Figure 5) made fast to a shaft 78 journaled in the upper part of the casing 75, said shaft 78 being laterally disposed and protruding through the case to the exterior thereof where it carries a toothed wheel 79 (see Figure 6). This wheel 79 has its teeth arranged to fit holes in a rack bar 80, which is substantially vertically disposed and has its lower end connected to the inner line lever 17 heretofore described. Thus, as the rack bar 80 is driven up or down by the toothed wheel 79, the platform 21 must be adjusted up or down.

Looking again at Figure 6, it will be seen that the shaft 78 carries a guide yoke 81 provided with a pair of spaced guide rollers 82 that act to hold the rack bar 80 at all times into engagement with the wheel 79. (See also Figure 4.) This rack bar is provided with an offset extension 83 adjacent its upper end, said extension carrying upper and lower stops 84, 85, which may be adjustably fixed relatively to each other on said extension 83. These stops are designed, as the bar 80 reaches a maximum up or down point of travel, to engage a trip in the form of a crank 86 carried rockably in brackets 87 mounted on an appropriate support 88 extending stubblewardly from the top of the thresher body 14. The other end of the crank 86 is provided with a portion 89 (see also Figure 5) that extends downwardly and seats in a cup 90 fastened on the plate 60, heretofore described. This cup 90 is oppositely disposed with respect to the arm 62. Means is provided normally to hold the double clutch element 56 is neutral position and in describing such mechanism reference is to be made to Figures 5 and 7 where it will be seen that the top plate of the gear housing 48 carries two spaced eyes 91 in which is slidably carried an arm 92 encircled by a coil spring 93 disposed between the two eyes 91. This arm 92 is integrally formed as an extension of the sleeve 61 heretofore described. The spring 93 exerts a force at all times to hold or return the shipper 58 to neutral position, as appears in Figure 3. The operation of the machine and the improved power lift platform mechanism will now be described.

The operator occupies his seat on the tractor 30 which pulls the harvester thresher through the field. The usual harvester parts are all set into motion in the usual way to cut the crop which is passed over the conveyer 22, spout 16, and finally into the separator body 14 for threshing. The standing grain encountered by the machine in some places will be tall and in others relatively short. It, therefore, becomes necessary to raise or lower the platform to adjust its height of cut. Let us assume that the platform 21 is in a low position and that it is desired to raise the same. Accordingly, the operator from his seat on the tractor will pull the rope 67 or 68, as the case may be, depending upon the direction of rotation of the power take-off shaft 31, such actuation of the appropriate rope acting through the bell crank lever 61, link 63, and bar 62 to shift the double clutch element 56, to cause one or the other of its cone surfaces 57 to pick up and rotate either gear 52 or 53. Thus the pinion 72 is rotated in one or the other direction, which operates the gearing 76 and toothed wheel 79, thereby causing the rack bar 80 to be raised. As this bar 80 is connected to the line bar 17, the platform 21 must be raised. Such raising movement of the platform continues so long as the operator continues his pull on the appropriate rope 67 or 68 to keep the clutch engaged. As soon as such pull is released, the spring 93 causes the lever arm 92 to resume its central position and, as the shipper fork 58 is connected to this arm 92, the fork 58 likewise is returned to neutral position with the clutch element 56 out of driving engagement with gear 52 or 53, as the case may be. As the worm gearing 76, 77 locks when not driven, the toothed wheel 79 is held fixed to maintain the rack bar 80 and the harvester platform in any position to which it has been adjusted.

The stops 84, 85 are provided as a safety measure in that they act automatically to trip the crank 86 and, through parts 89, 90, to throw out the clutch element 56 in the event the operator pulls too long on one of the ropes. Thus, the driving parts may be automatically made inoperative whenever the rack bar 80 and platform reach a maximum up or down position.

It can now be seen that improved power means is herein provided, which can be manually initiated in a convenient manner by the operator from his station on the tractor, for adjusting the platform up or down as may be required in the operation of the harvester thresher, thus achieving all of the desirable objects for the invention heretofore recited.

It is the intention to cover all such changes and modifications of the example herein chosen for purposes of illustration which do not in material respects depart from the spirit and scope of the invention set forth in the appended claims.

What is claimed is:

1. The combination with a tractor-pulled harvester thresher in which the harvester thresher comprises an axle carrying a separator housing and a platform connected to the axle for up and down adjustment, of power actuated platform adjusting means carried by the separator housing including a bar connected to raise and lower the platform, means to hold the power actuated means normally inoperative, and means comprising flexible pull ropes operable by the operator from his seat on the tractor to overcome said holding means and to cause actuation of the power means.

2. The combination with a tractor-pulled harvester thresher in which the harvester thresher comprises an axle carrying a separator housing and a platform connected to the axle for up and down adjustment, power driven gearing including a clutch for driving the gearing in either direction carried by the separator housing, means operated by said gearing and connected to raise or lower the platform, means normally holding the clutch in neutral position to hold the gearing idle, and means controllable by the operator from his station on the tractor for engaging the clutch to operate the gearing in either direction to raise or lower the platform by power.

3. The combination with a tractor-pulled harvester thresher in which the harvester thresher comprises an axle carrying a separator housing and a platform connected to the axle for up and down adjustment, power driven gearing including a clutch for driving the gearing in either direction carried by the separator housing, a bar operated by said gearing and connected to raise or lower the platform, spring means normally holding the clutch in neutral position to hold the gearing idle, and means controllable by the operator from his station on the tractor for overcoming said spring means to engage the clutch for operating the gearing in either direction to raise or lower the platform by power.

4. The combination with a tractor-pulled harvester thresher in which the harvester thresher comprises an axle carrying a separator housing and a platform connected to the axle for up and down adjustment, power driven gearing including a clutch for driving the gearing in either direction carried by the separator housing, a bar operated by said gearing and connected to raise or lower the platform, means normally holding the clutch in neutral position to hold the gearing idle, and flexible elements controllable by the operator from his station on the tractor for engaging the clutch to operate the gearing in either direction to raise or lower the platform by power.

5. A harvester thresher comprising, in combination, an axle, a separator housing thereon, a platform connected with the axle for up and down movement, gearing carried by the said housing, means operable by said gearing and connected with the platform to raise and lower the latter, means normally holding the gearing inactive, and manually actuated means for setting the gearing into operation, said gearing remaining in operation so long as the operator exerts force on said manually actuated means.

6. A harvester thresher comprising, in combination, an axle, a separator housing thereon, a platform connected with the axle for up and down movement, gearing carried by the said housing, a rack bar operable by said gearing and connected with the platform to raise and lower the latter, means normally holding the gearing inactive, and manually pulled flexible means for setting the gearing into operation, said gearing remaining in operation so long as the operator pulls on said flexible means.

7. A harvester thresher comprising, in combination, an axle, a separator housing carried thereby, a platform connected with the axle for up and down adjustment, means for adjusting the platform, said means comprising a driven shaft carried in a case on the separator housing, a double clutch element slidable on the shaft in the case, a pair of bevel gears loose on the shaft either of which may be driven from the clutch element, a bevel gear in mesh with said pair of gears, worm gearing driven by said last mentioned bevel gear, a toothed wheel exterior of the case driven by said worm gearing, a rack bar driven by the toothed wheel, said rack connected to raise or lower the platform, a fork for sliding the clutch, connections including a bell crank lever pivotally mounted on the separator housing for operating the fork, means normally holding the fork and clutch element in a neutral position between the pair of bevel gears, and means for operating the bell crank.

8. A harvester thresher comprising, in combination, an axle, a separator housing carried thereby, a platform connected with the axle for up and down adjustment, means for adjusting the platform, said means comprising a driven shaft carried in a case on the separator housing, a double clutch element slidable on the shaft in the case, a pair of bevel gears loose on the shaft either of which may be driven from the clutch element, a bevel gear in mesh with said pair of gears, worm gearing driven by said last mentioned bevel gear, a toothed wheel exterior of the case driven by said worm gearing, a rack bar driven by the toothed wheel, said rack connected to raise or lower the platform, a fork for sliding the clutch, connections including a bell crank lever pivotally mounted on the separator housing for operating the fork, means normally holding the fork and clutch element in a neutral position between the pair of bevel gears, and flexible means connected to the bell crank for operating the same.

9. A harvester thresher comprising, in combination, an axle, a separator housing carried thereby, a platform connected with the axle for up and down adjustment, means for adjusting the platform, said means comprising a driven shaft carried in a case on the separator housing, a double clutch element slidable on the shaft in the case, a pair of bevel gears loose on the shaft either of which may be driven from the clutch element, a bevel gear in mesh with said pair of gears, a toothed wheel exterior of the case driven from said gearing, a rack bar driven by the toothed wheel, said rack connected to raise or lower the platform, a fork for sliding the clutch, lever means on the separator housing for operating the fork, means normally holding the fork and clutch element in a neutral position between the pair of bevel gears, and ropes connected with the lever for operating the same.

10. A harvester thresher comprising, in combination, an axle, a platform connected with the axle for up and down adjustment, means for adjusting the platform, said means comprising a driven shaft carried in a case on the harvester thresher, a double clutch element slidable on the shaft in the case, a pair of bevel gears loose on the shaft either of which may be driven from the clutch element, a bevel gear in mesh with said pair of gears, worm gearing driven by said last mentioned bevel gear, a toothed wheel exterior of the case driven by said worm gearing, a rack driven by the toothed wheel, said rack connected to raise or lower the platform, a fork for sliding the clutch, connections including a lever for operating the fork, means normally holding the fork and clutch element in a neutral position between the pair of bevel gears, and remote control means for operating the lever.

11. The combination with a tractor-pulled harvester thresher in which the harvester thresher comprises an axle carrying a separator housing and a platform connected to the axle for up and down adjustment, power driven gearing including a clutch for driving the gearing in either direction carried by the separator housing, a bar operated by said gearing and connected to raise or lower the platform, means normally holding the clutch in neutral position to hold the gearing idle, means controllable by the operator from his station on the tractor for engaging the clutch to operate the gearing in either direction to raise or lower the platform by power, and safety means including limit stops on the bar for automatically returning the clutch to neutral position when the bar reaches predetermined maximum up or down positions.

12. The combination with a tractor-pulled harvester thresher in which the harvester thresher comprises an axle carrying a separator housing and a platform connected to the axle for up and down adjustment, of power actuated means carried by the separator housing including a bar connected to raise and lower the platform, means for controlling actuation of the power means from the operator's station on the tractor, and safety means including limit stops for automatically stopping the power actuated means when the bar reaches predetermined maximum up or down positions.

13. A harvester thresher comprising, in combination, an axle, a separator housing thereon, a platform connected with the axle for up and down movement, gearing carried by the said housing, means operable by said gearing and connected with the platform to raise and lower the latter, means normally holding the gearing inactive, manually actuated tension means for overcoming the holding means to set the gearing into operation, said gearing remaining in operation so long as the operator tensions said means, and safety means including limit stops for automatically stopping the gearing when the platform reaches maximum up or down positions in the event the operator keeps said tension means tensioned too long.

14. A harvester thresher comprising, in combination, an axle, a separator housing carried thereby, a platform connected with the axle for up and down adjustment, means for adjusting the platform, said means comprising a driven shaft carried in a case on the separator housing, a double clutch element slidable on the shaft in the case, a pair of bevel gears loose on the shaft either of which may be driven from the clutch element, a bevel gear in mesh with said pair of gears, worm gearing driven by said last mentioned bevel gear, a toothed wheel exterior of the case driven by said worm gearing, a rack driven by the toothed wheel, said rack connected to raise or lower the platform, a fork for sliding the clutch, connections including a lever on the separator housing for operating the fork, means normally holding the fork and clutch element in a neutral position between the pair of bevel gears, remote control means for operating the lever, and safety means for automatically throwing the clutch to neutral position when the rack reaches predetermined extreme positions in its travel.

15. A harvester thresher comprising, in combination, an axle, a separator housing carried thereby, a platform connected with the axle for up and down adjustment, means for adjusting the platform, said means comprising a driven shaft carried in a case on the separator housing, a double clutch element slidable on the shaft in the case, a pair of bevel gears loose on the shaft either of which may be driven from the clutch element, a bevel gear in mesh with said pair of gears, a toothed wheel exterior of the case driven by said gearing, a vertically disposed rack bar driven by the toothed wheel, said rack connected to raise or lower the platform, a fork for sliding the clutch, connections including a lever on the separator housing for operating the fork, means normally holding the fork and clutch element in a neutral position between the pair of bevel gears, remote control means for operating the lever, limit stops on the rack bar, and means tripped into operation by said stops for throwing out said clutch when the rack bar reaches predetermined maximum up or down positions of travel.

16. The combination with a harvester thresher comprising an axle carrying a separator housing and a platform, the latter connected to the axle for up and down adjustment, of power actuated platform adjusting reduction gearing including a bar connected to raise and lower the platform, means to hold the power actuated gearing normally inoperative, and manually operable means to overcome said holding means to cause actuation of the gearing.

17. The combination with a tractor pulled harvester thresher in which the harvester thresher comprises an axle carrying a separator housing and a platform, the latter connected to the axle for up and down adjustment, of power actuated platform adjusting reduction gearing having a connection to raise and lower the platform, means to hold the power actuated gearing normally inoperative, and manually operable remote control means to overcome said holding means to cause actuation of the gearing.

ALBERT B. WELTY.